(12) United States Patent
Lee

(10) Patent No.: US 9,426,277 B2
(45) Date of Patent: Aug. 23, 2016

(54) METHOD AND APPARATUS FOR OPERATING MESSAGE FUNCTION IN CONNECTION WITH NOTE FUNCTION

(71) Applicant: Samsung Electronics Co., Ltd., Gyeonggi-do (KR)

(72) Inventor: Yujin Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 34 days.

(21) Appl. No.: 14/317,561

(22) Filed: Jun. 27, 2014

(65) Prior Publication Data

US 2015/0017952 A1 Jan. 15, 2015

(30) Foreign Application Priority Data

Jul. 10, 2013 (KR) ........................ 10-2013-0080689

(51) Int. Cl.
*H04B 1/38* (2015.01)
*H04M 1/725* (2006.01)
*H04W 4/12* (2009.01)

(52) U.S. Cl.
CPC ........... *H04M 1/72552* (2013.01); *H04W 4/12* (2013.01)

(58) Field of Classification Search
USPC ......................................... 455/566
See application file for complete search history.

(56) References Cited

U.S. PATENT DOCUMENTS

2007/0239836 A1 10/2007 Ahn et al.
2011/0256907 A1 10/2011 Lee et al.
2012/0064947 A1 3/2012 Yi et al.
2012/0117568 A1 5/2012 Plotkin
2012/0185796 A1 7/2012 Tanaka

FOREIGN PATENT DOCUMENTS

KR 10-2009-0002940 A 1/2009
KR 10-2011-0081605 A 7/2011
KR 10-2011-0136078 A 12/2011
KR 10-2012-0026395 A 3/2012

*Primary Examiner* — Joel Ajayi
(74) *Attorney, Agent, or Firm* — Cha & Reiter, LLC

(57) ABSTRACT

Disclosed herein are a method and an apparatus for viewing messages. A message is displayed and a memo addition event is detected. Input memo data is associated with the message.

16 Claims, 11 Drawing Sheets

METHOD AND APPARATUS FOR OPERATING MESSAGE FUNCTION IN CONNECTION WITH NOTE FUNCTION

CROSS-REFERENCE TO RELATED APPLICATION

This application claims the benefit of priority under 35 U.S.C. §119(a) from Korean Patent Application No. 10-2013-0080689, filed on Jul. 10, 2013, which is incorporated by reference herein.

TECHNICAL FIELD

The present disclosure relates to a method and apparatus for operating a message function in connection with a memo function and, more particularly, to a method and apparatus for operating a message function in connection with an editable memo function.

BACKGROUND

Portable terminals, such as mobile telephones, have been used in various fields due to their convenience and portability. Such portable terminals have provided various input types to support user functions. For example, some portable terminals are equipped with a touch screen having a touch panel and a display panel. This may allow a user to select a specific image displayed on the display panel by processing touch input with the touch panel. In addition, a portable terminal may provide various functions such as a call function, an audio play function, a text message function, a digital broadcast reception function, a short distance wireless communication function, an Internet access function, and the like. Recently, portable terminals have allowed users to multi-task by allowing a plurality of functions to execute in parallel.

Portable terminals provide a message application function capable of enabling a user to transmit and receive a text. However, as shown in FIG. 1, although the transmitted or received message may be stored in a database, the portable terminal may not allow a user to arbitrarily edit the transmitted or received message.

Users may attempt to edit a transmitted or received text using a memo function such that a given message is cut and pasted onto a memo execution screen. As shown in FIG. 2, the user may edit the copied message displayed on the memo screen. However, copying the message onto a memo execution screen may generate duplicate data unnecessarily. In addition, it is inconvenient that a user cannot immediately edit a message without having to manually cut and paste the text message onto a memo application screen. In addition, it is inconvenient that the user has to manually associate the message with the memo data.

SUMMARY

In view of the forgoing, disclosed herein are a method and apparatus for operating a text message in conjunction with a memo. The method and apparatus disclosed herein are capable of storing and managing the text by associating it with user editable memo data.

The present disclosure further provides a method and apparatus for operating a text message function in conjunction with a memo function such that the memo data may be displayed together with an associated text message on a message reception screen.

In addition, the present disclosure provides a method and apparatus for operating a text message in connection with a memo function that allow the memo associated with the message to be included in a query, when searching for the message. Moreover, the apparatus and method disclosed herein are capable of keeping the memo separate from the text message to facilitate editing of the memo and the text.

In accordance with an aspect of the present disclosure, a method of operating a message function may include: displaying a message; detecting a memo addition event to add memo data to the message; displaying an editable memo area, in response to the memo addition event, in conjunction with the message; detect memo data being input into the memo area; and associating the memo data with the message.

In accordance with another aspect of the present disclosure, an apparatus for operating a message function may include: a processor to: display a message on a display unit; detect a memo addition event, through an input unit, to add memo data to the message; display on the display unit an editable memo area, in response to the memo addition event, in conjunction with the message; detect, using the input unit, memo data being input into the memo area; and associate the memo data with the message.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Examples of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Before describing examples in detail, an example electronic apparatus may include a mobile communication terminal, a Personal Digital Assistant (PDA) a smart phone, a tablet Personal Computer (PC), a Portable Multimedia Player (PMP), an electric book terminal, a Notebook computer, a Netbook computer, or the like.

Figure 1:
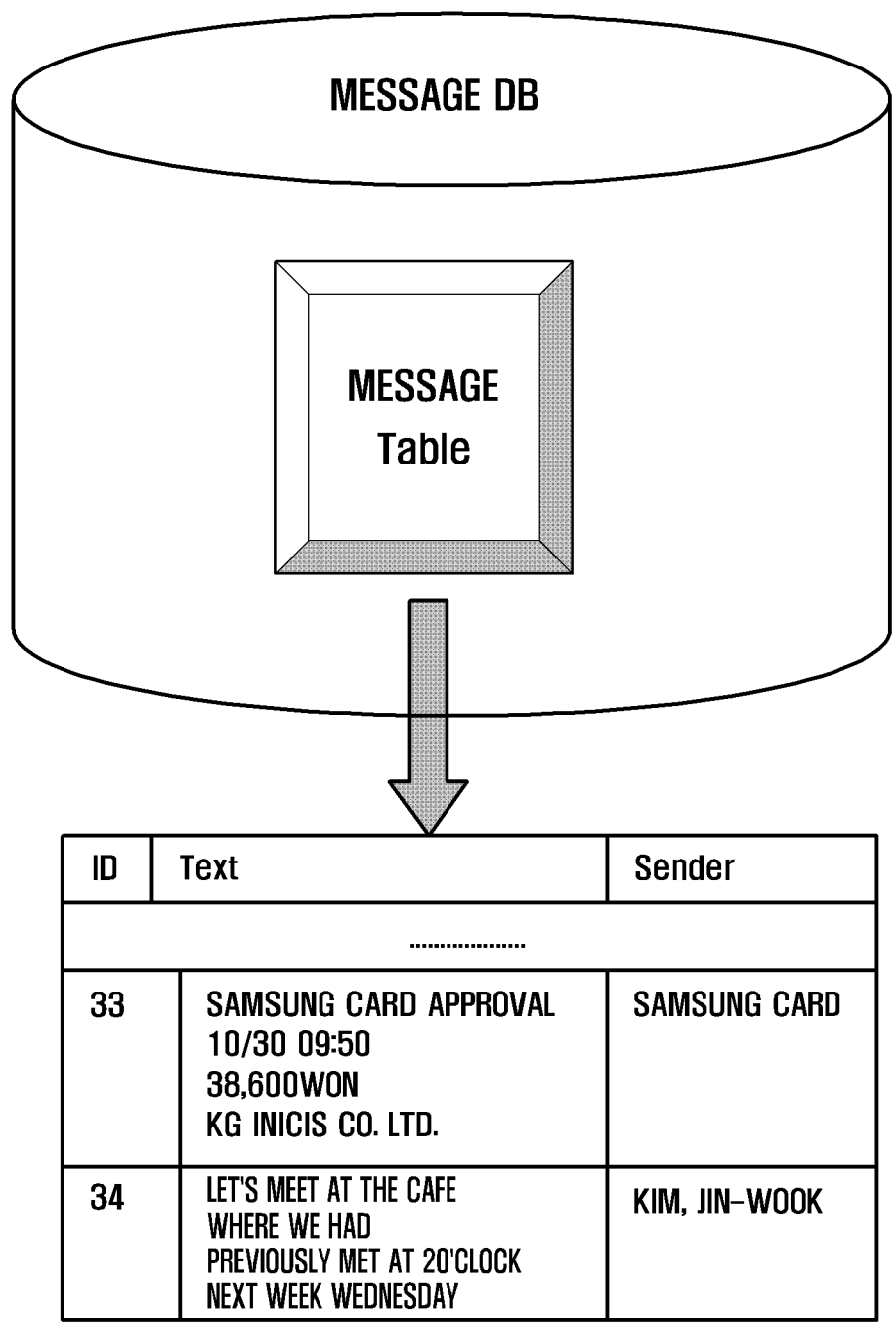
FIG. 1 and FIG. 2 are views illustrating conventional messaging functions.
Figure 2:
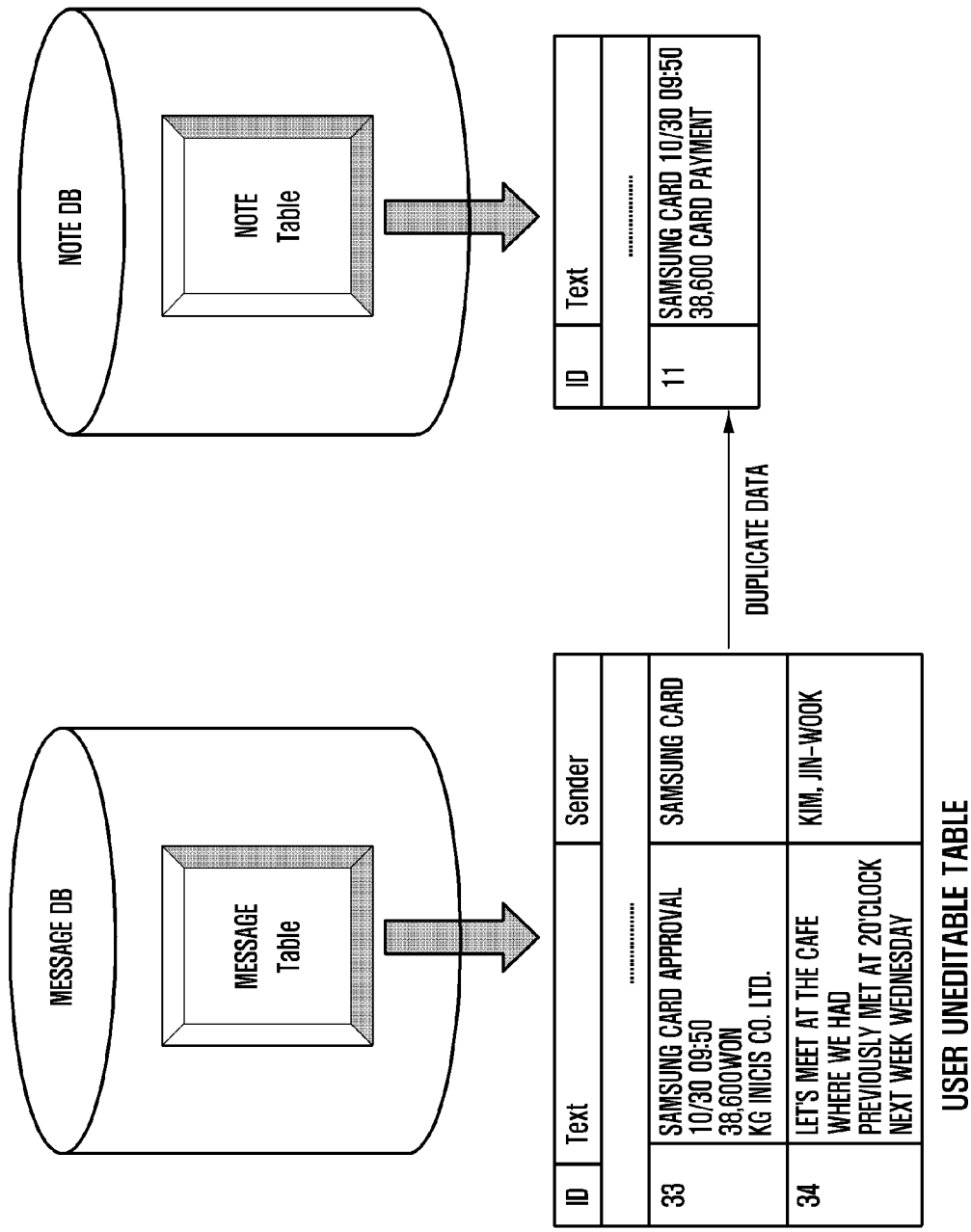
Figure 3:
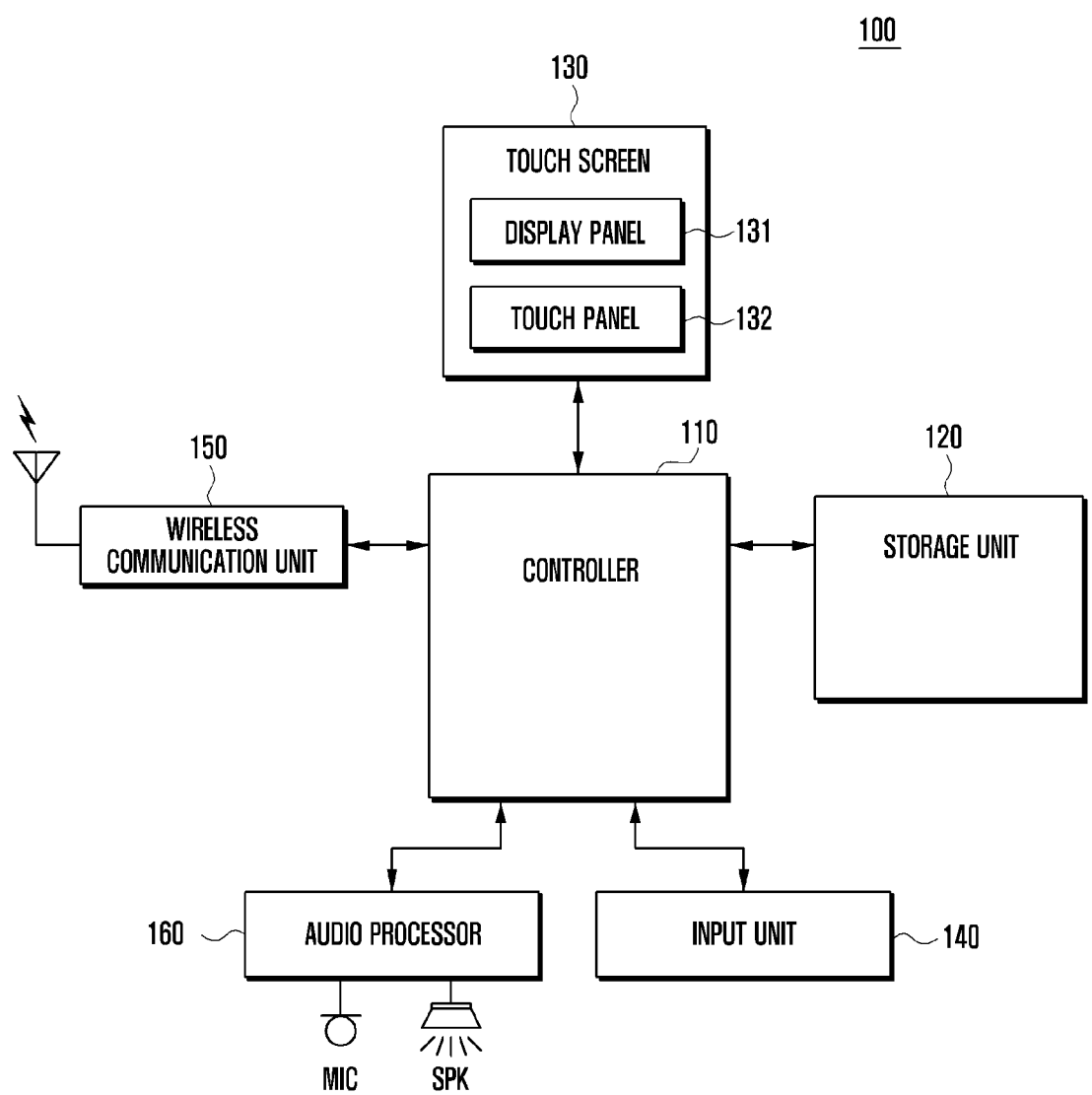
FIG. 3 is a block diagram illustrating an example electronic apparatus in accordance with aspects of the present disclosure.

FIG. 3 is a block diagram illustrating an example electronic apparatus in accordance with aspects of the present disclosure. An example electronic apparatus may include an audio processor 160, a wireless communication unit 150, an input unit 140, a touch screen 130, a storage unit 120 and a controller 110. The touch screen 130 may include a display panel 131 and a touch panel 132.

The electronic apparatus 100 may support a memo function associated with a message. For example, when the electronic apparatus 100 detects an occurrence of an event for adding a memo while performing a text message function, the electronic apparatus 100 may reconfigure a displayed text message so as to add a memo area. The memo data input into the set memo area may be stored and associated with the corresponding text message, so that the text may be flexibly utilized with editable memo data, while the text message is maintained.

The text message, may comprise one of a Multi Message Service (MMS) message, a Short Message Service (SMS) message, a Long Message Service (LMS) message, a multi-mail, or may be any message that is generally un-editable after the message is transmitted or received.

The above described editable memo may be amended, deleted, copied, pasted, or added to. The editable memos may be displayed in a list view format. In addition, the memo data may include characters, images, sounds, or representative icons.

When the electronic apparatus 100 receives a display signal for displaying the message previously stored and associated with the memo data, the electronic apparatus 100 may output the corresponding message and the memo data associated with the message in response. Thus, a user may rapidly and conveniently look up the memo data associated with the message without separately loading or activating a memo application.

In addition, when the electronic apparatus 100 receives a search signal, such as a query with at least one search word, for searching previously stored messages, electronic apparatus 100 may search for the message and the memo data associated with the message. In addition, at least one of the searched message or its associated memo data may be output together with the connected memo data or message. Thus, a more exact and convenient search function may be provided.

When the electronic apparatus 100 receives an edit signal for editing memo data or for editing a previously stored message associated with the memo data, the electronic apparatus 100 may separate the memo data from its associated message and may permit the separated memo data to be edited. Such separation between memo data and its associated message may be configured by a user with predefined settings. Thus, the memo data separated from the message may be amended, deleted, copied, pasted, etc. In addition, the edited memo data associated with the message may be restored.

Hereinafter, each element of an example electronic apparatus 100 that may implement the memo function described above will be described in more detail.

The wireless communication unit 150 may form a communication channel to communicate (including a voice call and a video call) with a base station and a data communication channel to transmit data. To this end, the wireless communication unit 150 may include a wireless frequency transmitting unit (not shown) to up-convert the frequency of a transmitted signal and amplify the signal, a wireless frequency receiving unit (not shown) to low-noise amplify a received signal and down-convert the frequency of the signal, and a transmission and reception separating unit (not shown) to separate a received signal from a transmitted signal.

The audio processor 160 may include a speaker SPK to output audio data transmitted and received during a call, audio data included in a received message and audio data due to a play of an audio file stored in the storage unit 120, and a microphone MIC to collect a user voice during a call or other audio signal.

The input unit 140 may include an input key and functional keys to receive numerical or various character information, set various functions and control a function of the portable terminal 100. Specifically, the input unit 140 may transmit an input signal of requesting to add the memo data to the message, an input signal of requesting to display the stored message, an input signal of requesting to search the stored message, an input signal of requesting to output a message list, and an input signal of requesting to edit the memo data.

The input unit 140 may include one of a button type key pad, a ball joystick, an optical joystick, a wheel key, a touch key, a touch panel and a touch screen 130, or a combination of them.

The touch screen 130 may perform the input function and the display function. To this end, the touch screen 130 may include a display panel 131 and a touch panel 132.

The display panel 131 displays various kinds of menus of the electronic apparatus 100, information input by a user, or information provided to the user. That is, the display panel 131 may display various screens in accordance with use of the electronic apparatus 100, such as an idle screen (home screen), a menu screen, a message writing screen, a message receiving screen, a previously stored message output screen, a memo writing screen, a memo editing screen, a call screen, a schedule management screen, an address list screen, and a web page output screen, or the like.

Specifically, the display panel 131 may output a menu or an icon to add the memo data associated with a message and to activate an editing function in a certain area. The icon may be replaced with a specific side key. In addition, the display panel 131 may display an additional memo writing screen, and a written memo output screen. The additional memo writing screen may include a tool to write a memo. The tool may include tools to input a text, a diagram, a line, a sign and an emoticon, and the like.

The memo function execution screen may be displayed together with a message display screen. For example, a first area to display a message and a second area for adding the memo data may be included in the entire display screen of the electronic apparatus. The second area may be placed in at least one of an upper side, a lower side, a right side or a left side of the message, or may be an area overlaid with the message display screen.

The display panel 131 may be implemented with a Liquid Crystal Display (LDC), an Organic Light Emitted Diode (OLED), or an Active Matrix Organic Light Emitted Diode (AMOLED).

The touch panel 132 may be mounted on the front surface of the display panel 131. When a touch input means such as a user's finger or a stylus is touched to the touch panel 132, a touch event may be generated and the generated touch event may be transferred to controller 110. For example, the touch panel 132 may sense a touch based on the variation of a physical quantity such as an electrostatic capacity or a resistance in accordance with the touch by the touch input means and may transfer the touch location information to controller 110. The touch panel 132 may include a first touch panel to recognize a general touch such as a user gesture and a second touch panel to recognize a precise input such as a memo input.

The storage unit 120 may store an OS (Operating System) of the electronic apparatus 100, an application program necessary for other optional functions such as a sound play function, an image or moving screen photographing function, an Internet access function, and a digital broadcasting program playing function, a user data, and a data transmitted and received during communication. For example, the storage unit 120 may store a video file, a game file, a music file, and a movie file.

Storage unit 120 may store the additional memo data input in the message display screen associated with the message. Storage unit 120 may also store edits to the memo data; may allow memo data associated with the message to be searched; and may store the program used to display the memo data associated with a previously stored message. Hereinafter, such a program will be described later in detail with reference to accompanying drawings.

In addition, the storage unit 120 may include a connection program to store a received/transmitted message and associate it with an index point of the added memo data. When a specific message is selected (e.g., touched) in the message output screen, the connection program may obtain its associated memo data and output the additional memo data to the screen.

Controller 110 may control the overall operations of the electronic apparatus 100 and the signal flow between the inner blocks of the electronic apparatus 100, and may perform a data processing function processing data. For example, controller 110 may be a Central Processing Unit (CPU), a Micro Processor Unit (MPU), and an application processor.

Specifically, controller 110 may control the operation of the memo function connected to the message.

That is, controller 110 may control a procedure of generating the additional memo data associated with the message, editing the generated additional memo data and storing the edited memo data. In this case, controller 110 may control the procedure of generating an object in accordance with the preset rule. In addition, controller 110 may control the procedures of outputting the stored message; outputting the additional memo data associated with the message; searching for the additional memo data and the message; keeping the message separate from its associated memo data to facilitate display or editing; and to restore the message or its associated memo data.

Although not shown in FIG. 3, the electronic apparatus 100 may selectively further include elements having additional functions such as a Global Positioning System (GPS) module to receive location information, a broadcasting receiving module to receive a broadcasting, a digital sound play module such as an MP3 module, and a short distance wireless communication module to perform a short distance wireless communication function. Such components may be variously modified in accordance with the trend of digital convergence, and thus not all such components may be listed here, but the electronic apparatus 100 may further include components of the same level as that of the above-mentioned components.

Figure 4:
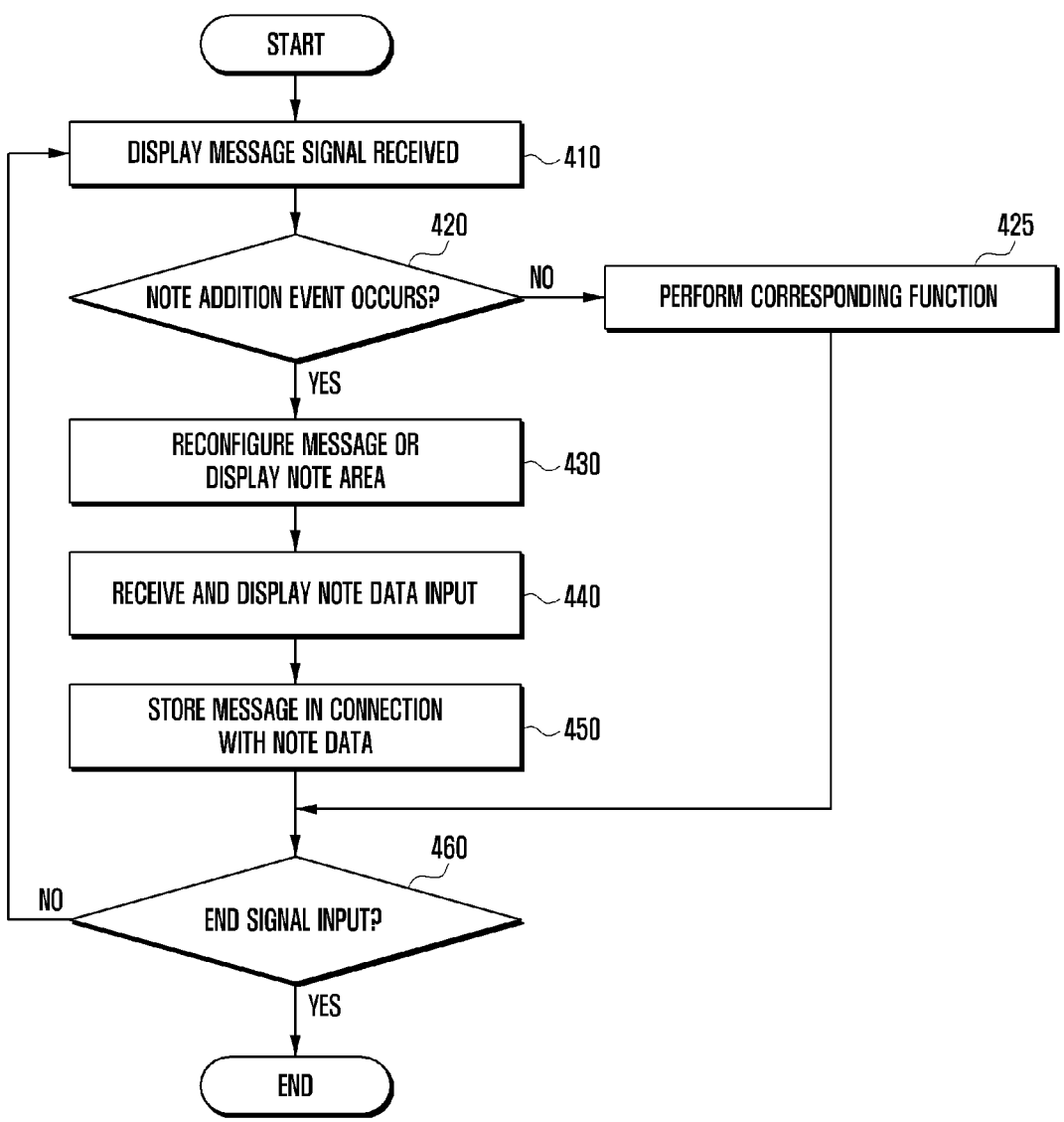
FIG. 4 is a flowchart illustrating an example method of adding memo data to a message and storing the memo data, in accordance with aspects of the present disclosure.

FIG. 4 is a flowchart illustrating an example method of adding memo data to a message and storing the memo data associated with the message. Referring to FIG. 4, controller 110 may display a transmitted/received message on the display unit, when a message application is executed and a request for displaying the transmitted/received message is detected, at operation 410.

When a memo addition event is generated, controller 110 may detect the memo addition event through the touch panel at operation 420. The memo addition event may be generated by a preset gesture, a button input, and an icon execution, when the message is displayed. The button and the icon may be set as default so that the button and the icon may be displayed in the message display screen. The memo addition event may be input by a touch input, such as a finger touch, a pen touch or a touch action, or by a specific button. If no memo addition event is detected at operation 420, the function corresponding to the detected event may be performed at operation 425.

Then, in response to the memo addition event, controller 110 may reconfigure the displayed message and may display a memo area for the memo data to be added, at operation 430. That is, when the memo addition event is generated and the message is displayed, the message display screen may be reconfigured to record the memo data, such that the memo area is added into the message display screen. The memo area may be automatically set in a preset area which is a part of the message display screen, or may be set in accordance with the location of the touch input generated by a user. The memo area may be set at an upper side, a lower side, a left side or a right side of the displayed message, or may be set as an area overlaying the displayed message.

Controller 110 may receive the memo data input into the displayed memo area and may display the memo data on the display unit at operation 440. In this case, the memo data may be input using the pen touch pen, the finger touch input and/or the keypad input. The memo data added to the message may include a character, an image, or a sound. The memo data may further include a cursive character, a non-character pattern (a figure, a diagram, a line, an icon, and the like) and multimedia data. The memo data may be further associated with a function of another application or linked to a specific URL address.

Figure 9:
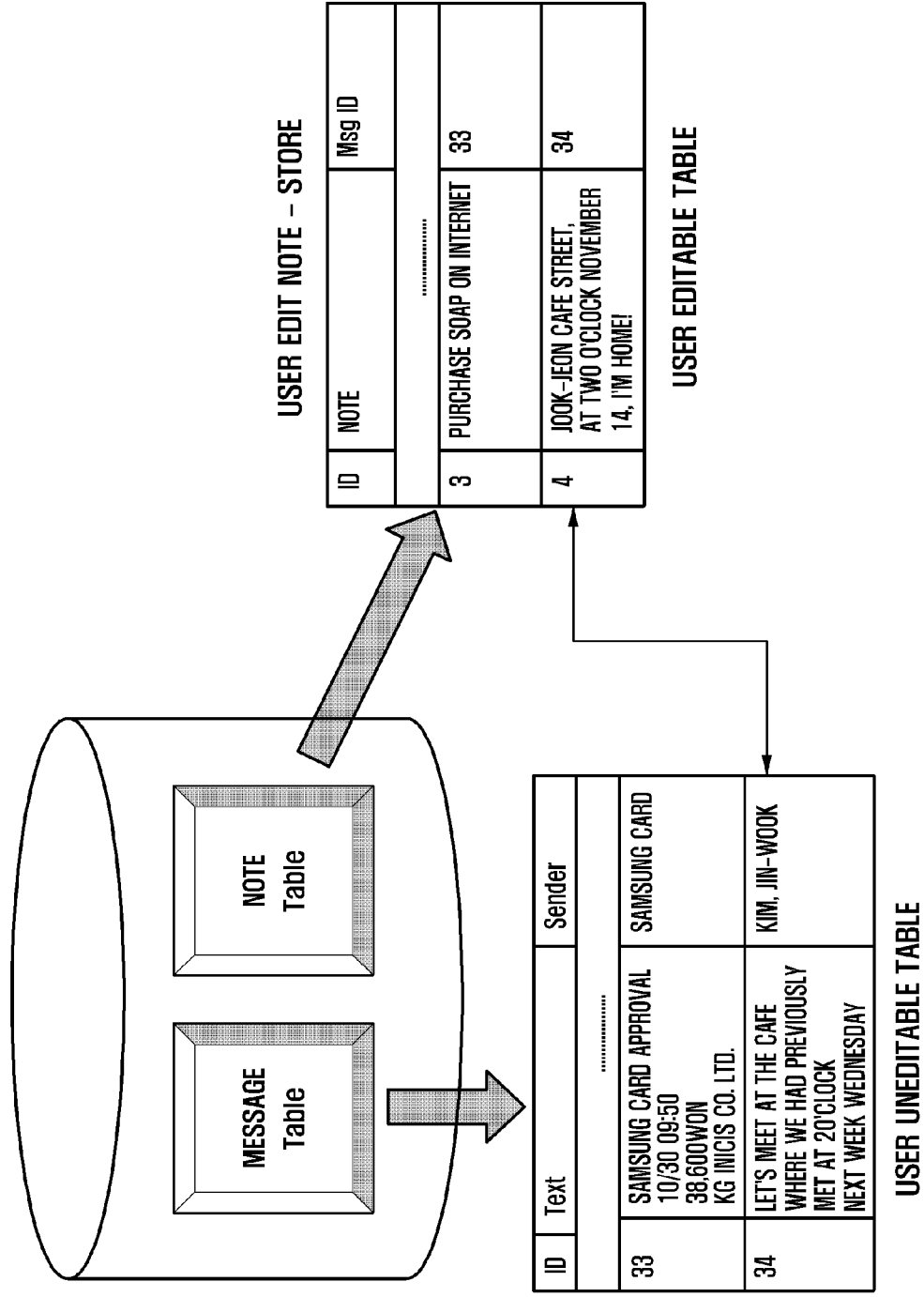

When the operation is terminated after the memo data is input, controller 110 may sense it through the touch panel 132 and may store the input memo data by associating it with the message in storage unit 120, at operation 450. In this case, controller 110 may combine and store the received/transmitted message (hereinafter, referred to as "Original Message") with the memo data. In addition, as shown in the example of FIG. 9, controller 110 may store the memo data associated with an ID of the original message such that the original message and the memo data associated with the original message may be stored in different storage spaces. In this example, when the previously stored message is displayed later, the memo data having a memo ID associated with the ID of the message may be displayed together with the message.

When the display signal stops at operation 460, the process may end; otherwise, controller 110 may loop back to operation 410.

Figure 5:
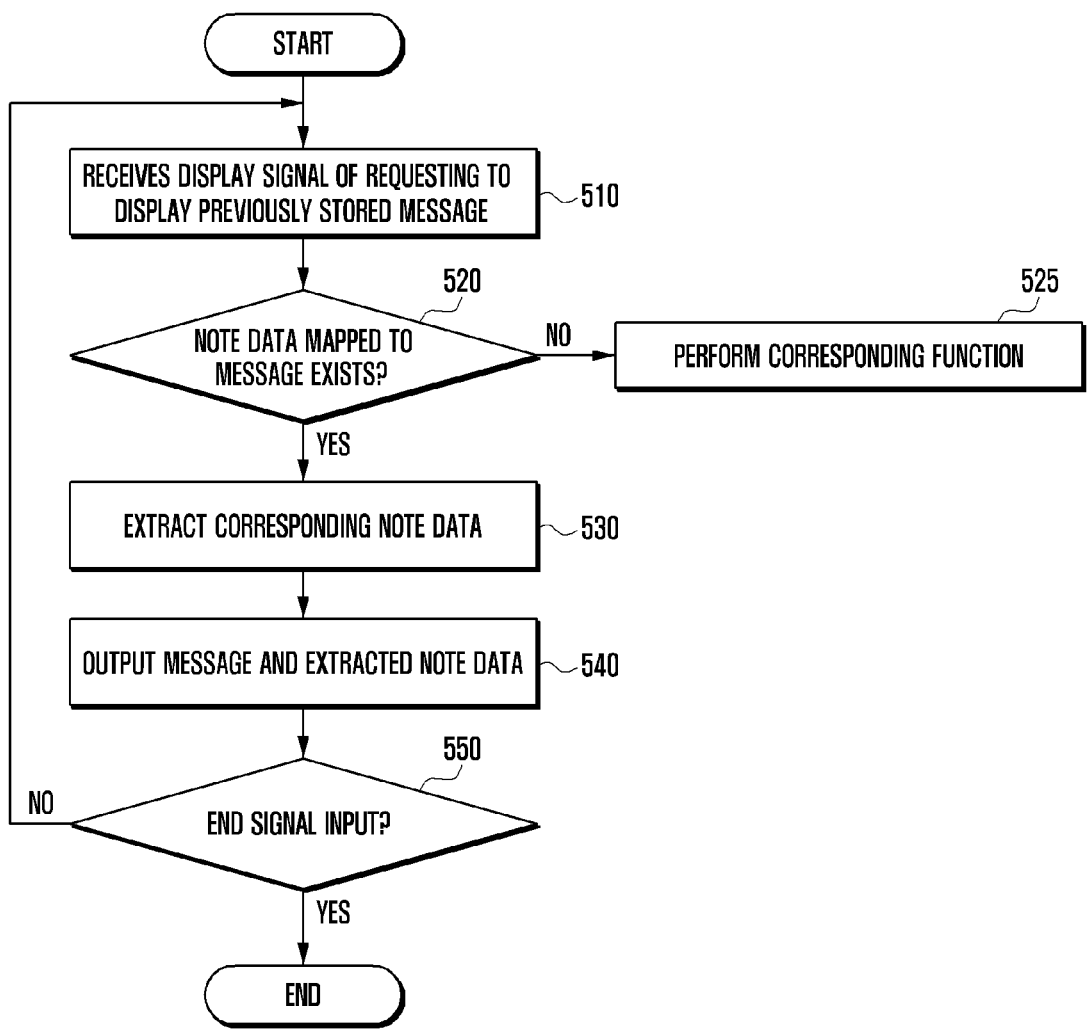
FIG. 5, FIG. 6 and FIG. 7 are flowcharts illustrating an example method of managing memo data associated with a message, in accordance with aspects of the present disclosure.
Figure 6:
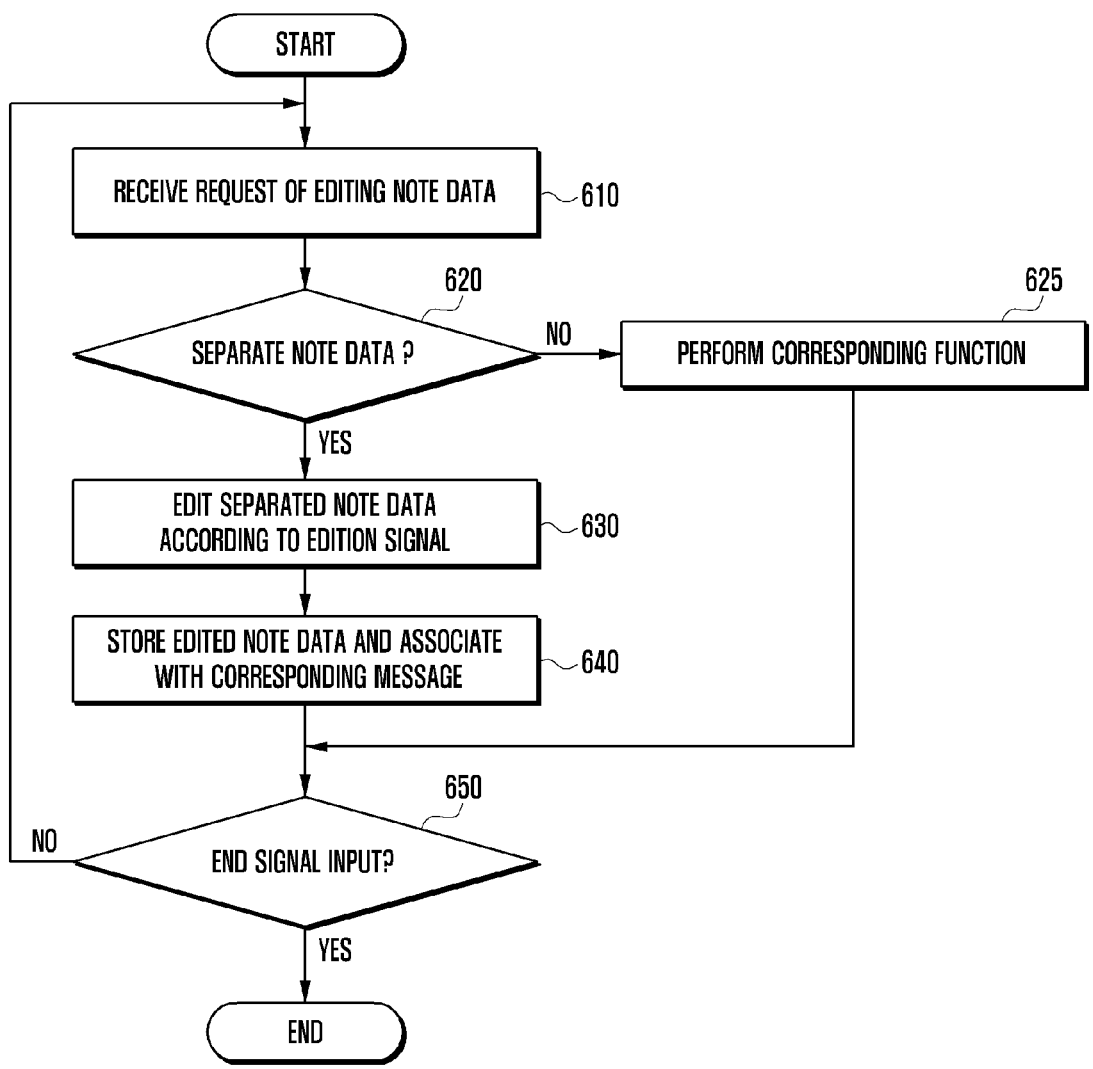
Figure 7:
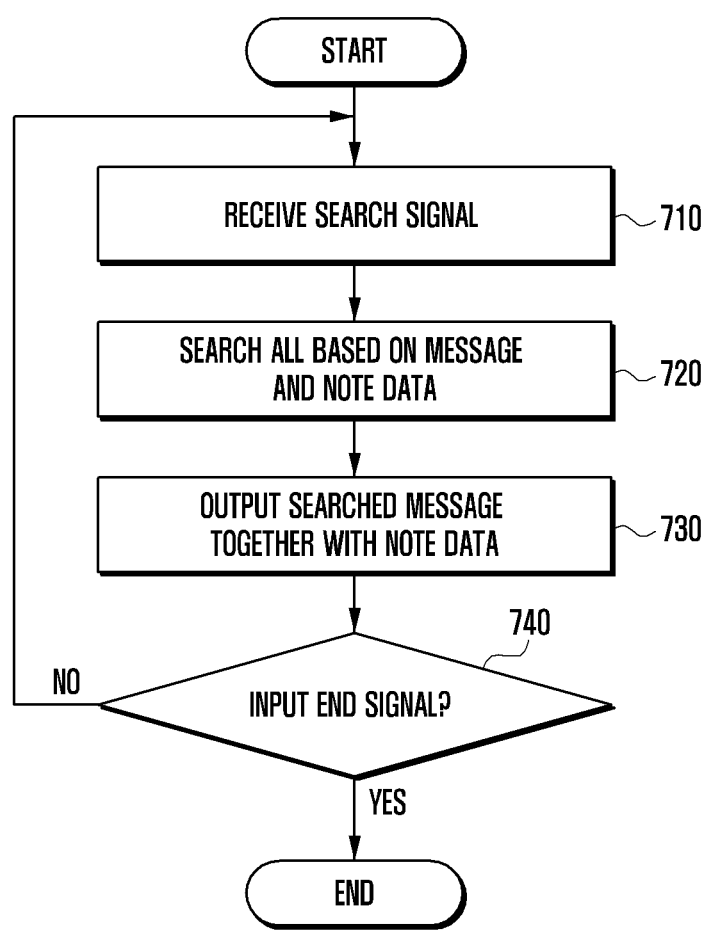

FIGS. 5 to 7 are flowcharts illustrating an example of managing memo data associated with a message in an electronic apparatus. FIGS. 8 to 11 are working examples of an execution screen for managing memo data associated with a message.

Referring to FIG. 5, when controller 110 receives a display signal requesting display of the previously stored message at operation 510, controller 110 may identify whether the memo data associated with the message exists, at operation 520. If the memo data associated with the message does not exist, a corresponding function to be performed as a result may be performed at operation 525.

When the memo data associated with the message exists, controller 110 may extract the memo data at operation 530. In this example, the memo data may be extracted from the data base in which the memo data is stored together with the message. In addition, as shown in FIG. 9, when the memo data associated with the message are stored in different databases, controller 110 may trace the ID of the memo data associated with the ID of the message such that the memo data may be extracted by using the traced ID.

At operation 540, controller 110 may output the extracted memo data together with the message data to display the extracted memo data and message on the touch screen 130. For example, the memo data may be displayed in the area adjacent to the area in which the message is displayed. When the memo data is video data or voice data, the memo data may be displayed by a sign (e.g., an icon) denoting such data. In addition, controller 110 may provide an option menu to select the message associated with the memo data or a message without associated memo data, and may display only the type of message selected through the option menu in a list. When a plurality of memo data are added to one message, the plurality of memo data may be displayed in a list and ordered by generation time, size, and the like. The order may alternatively be set by a manufacturer or designer. Thus, the user of the electronic apparatus may immediately check the memo associated with the message using the message itself.

If the display signal does not end at operation 550, controller 110 may loop back to operation 510. Otherwise, the process may end.

Referring to FIG. 6, controller 110 may receive an edit signal requesting to edit the memo data previously stored and associated with the message at operation 610.

As described above, when the memo data edit signal is received, controller 110 may determine whether to separate the memo data from the message at operation 620. For example, when the edit signal is received in accordance with a request or setting of a designer or a user, controller 110 may identify whether to display the memo data and its associated memo data separately.

When it is identified that the memo data and its associated message are to be displayed separately, at operation 620, controller 110 may separate the memo data from the message and display the separated memo data. For example, when sensing a long touch event on the memo data for a preset time period, controller 110 may hide the message display screen by super imposing the memo data display over the message display. When it is identified that the memo data and its associated message are not to be displayed separately, the function corresponding to the detected event may be performed at operation 625.

Controller 110 may edit the memo data in accordance with the edit signal at operation 630. The edit signal may be at least one of amending, deleting, copying, pasting, and the like. For example, referring now to FIG. 11, controller 110 may display just the memo data in accordance with the memo data management request of the user and may display a screen that allows a user to delete memo data.

When editing the memo data is complete, controller 110 may store the edited memo data in storage unit 120 and associate it with the corresponding message at operation 640. When the signal input ends at operation 650, controller 110 may end the process; otherwise, controller 110 may loop back to operation 610.

Referring to FIG. 7, controller 110 may receive a search signal requesting to search for a previously stored message at operation 710. For example, the search signal may be a query with a search word with at least one of a character, a numeral, or a sign. Controller 110 may search both memo data associated with each message and the messages themselves based on the search word at operation 720. As a result of the search, controller 110 may output the searched message together with the memo data at operation 730. That is, when a specific message is found in accordance with the search result, controller 110 may output the found message together with the memo data associated therewith. Furthermore, when memo data is found in accordance with the search result, the found memo data may be output together with the message associated therewith. If the receive search signal stops at operation 740, controller 110 may end the process; otherwise, controller 110 may loop back to operation 710.

Figure 10:
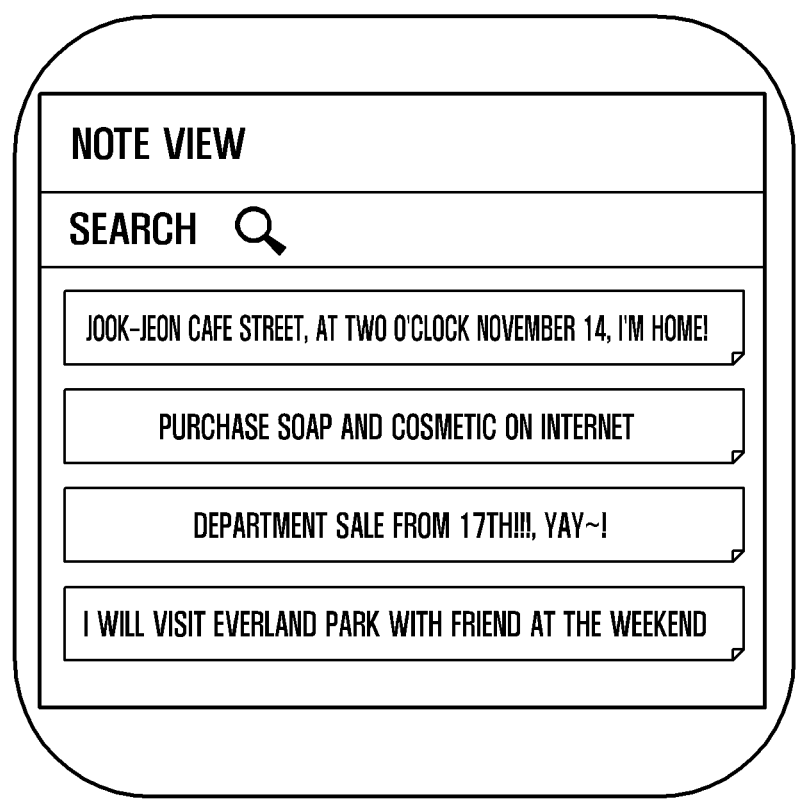
Figure 11:
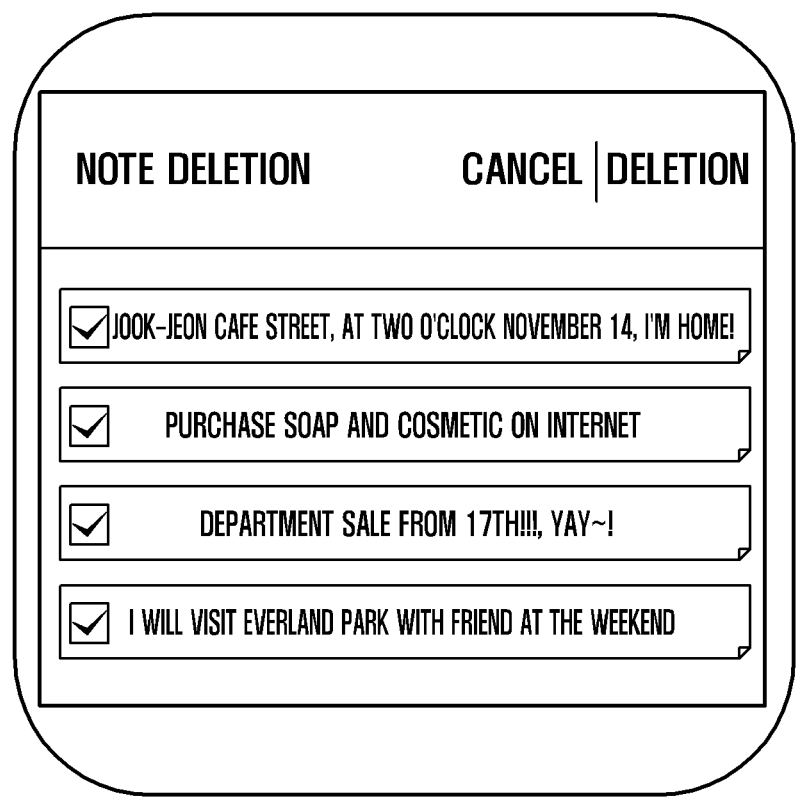

Alternatively, as shown in FIG. 10, when controller 110 receives the signal to search the memo data and messages associated therewith, controller 110 may separate the memo data from the message to display only the memo data and may display a search execution screen for searching the memo data.

Figure 8:
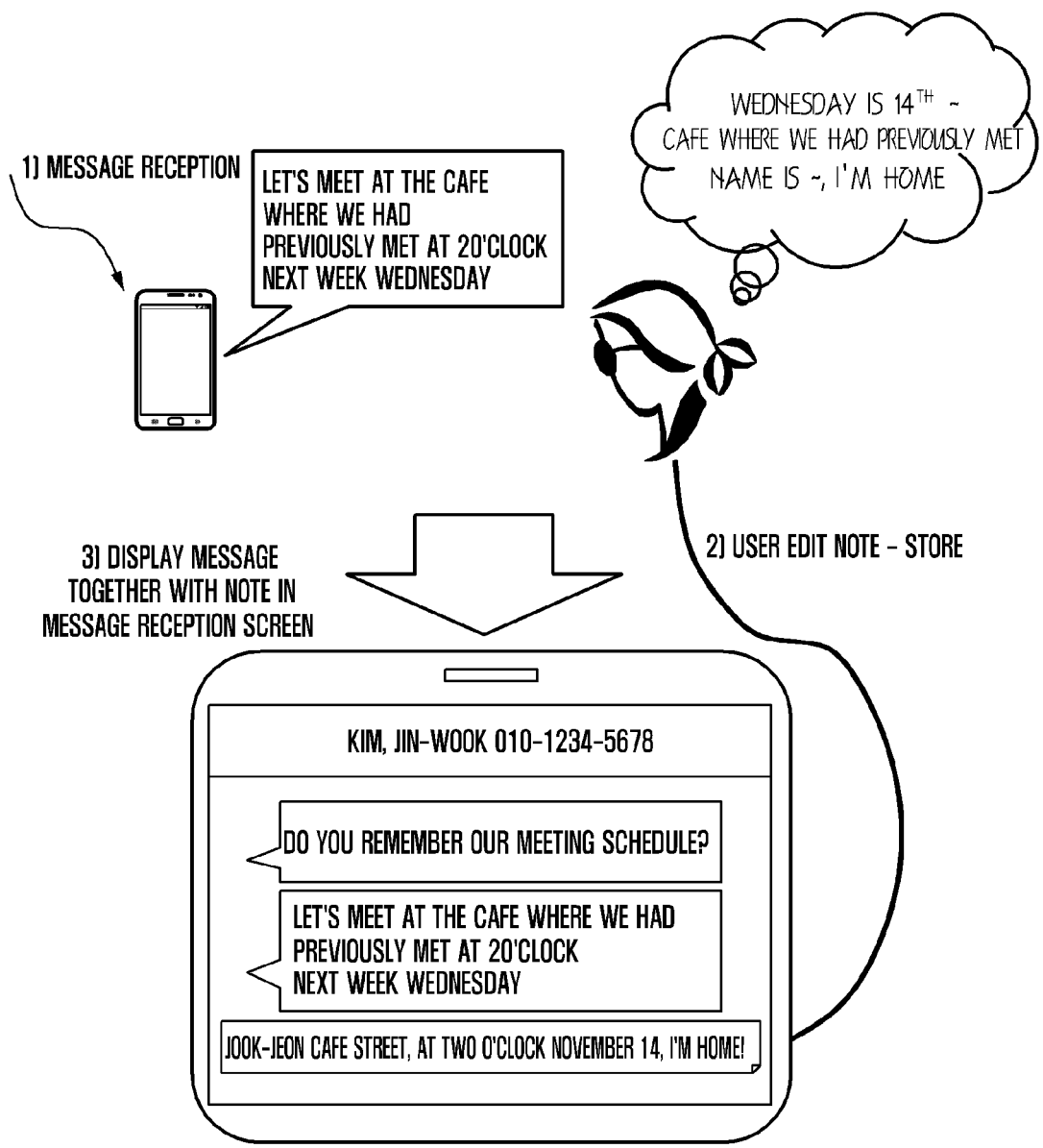
FIG. 8, FIG. 9, FIG. 10 and FIG. 11 are diagrams illustrating an example method for displaying an execution screen in accordance with aspects of the present disclosure.

FIG. 8 is a diagram illustrating a working example of adding a memo to a text message and associating the memo with the text. For example, a user may receive a message of "Let us meet again at the place where we had previously met soon" from his friend. Although the user may remember the place, the user may forget the date of the meeting. In this case, the user may generate a memo data addition event to add memo data in the screen in which the message is received, so that a new memo area may be displayed. The user may directly input information related to the place where the user had previously met with the friend to the displayed new memo area, and may store this memo together with the message.

A similar working example is shown in FIG. 9. When using a card, the user may receive information related to internet card payment through a text message. In this case, the user may mostly receive brief information such as the name of a payment gateway company, a purchase amount, and a purchase date. In this instance, the user may add a memo to the message related to the internet card payment. Thus, the memo may contain information related to the purchasing place and the purchasing product. Such memo be stored and associated with the message. The user may use these memos to recall additional information related to a plurality of internet card payments.

Advantageously, the memo data associated with the message may be stored with the message so that the user may check the memo data together with the message at a later time. This allows additional information not in the original message to be obtained.

As described above, the method of operating a message function associated with a memo function may be implemented in a program command form executable by various computer means and be recorded in a computer readable recording medium. In this case, the computer readable recording medium may include a program command, a data file, and a data structure individually or a combination thereof. In the meantime, the program command recorded in a recording medium may be specially designed or configured for the present disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, or flash memory for storing and executing program commands. Further, the program command includes a machine language code created by a compiler and a high-level language code executable by a computer using an interpreter. The foregoing hardware device may be configured to be operated in accordance with at least one software module to perform an operation of the present disclosure.

The above-described embodiments of the present disclosure can be implemented in hardware, firmware or via the execution of software or computer code by hardware, in which the firmware, software of computer code can be stored in a non-transitory recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium and loaded into hardware having circuitry that is used in general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software in conjunction with hardware or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that under the broadest reasonable interpretation, a "processor", "microprocessor" or "controller" comprises hardware circuitry in the claimed disclosure that is configured for operation by the execution of machine executable code. Under the broadest reasonable interpretation, the appended claims constitute statutory subject matter in compliance with 35 U.S.C. §101.

The definition of the terms "unit" or "module" as referred to herein is to be understood as constituting hardware circuitry such as a processor or microprocessor that may comprise an integrated circuit configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

As described above, in one example, the received message may be stored and associated with user editable memo data.

In another example, the memo data associated with a message may be displayed in a message display screen together with the message.

In a further example, when searching a message, the memo data associated with the message may also be queried, and the searched message or memo data may be displayed together with the message or memo data.

In yet another example, the memo data may be displayed separately from its associated message to facilitate editing.

Although examples of the present disclosure have been described in detail above, it is understood that many variations and modifications may be made to the examples without departing from the spirit and scope of the disclosure as defined by the appended claims and equivalents thereof.

What is claimed is:

1. A method of operating a message function in connection with a memo function, the method comprising:
    displaying on a display a plurality of Short Messaging Service (SMS) messages associated with a particular contact in an interface, wherein each of the plurality of SMS messages occupy separate portions of the display;
    detecting a memo addition event to add memo data to the message; and
    displaying an editable memo area, in response to the memo addition event, in conjunction with the message, wherein the editable memo area forms a portion of the interface and occupies a separate portion of the display, the separate portion of the display non-overlapping with the separate portions of the display occupied by the plurality of SMS messages.

2. The method of claim 1, wherein detecting the memo addition event comprises detecting an input on a touch panel.

3. The method of claim 1, wherein displaying the editable memo area comprises setting a predefined area of a message display screen as the memo area or setting the memo area in accordance with touch input detected at a location of the display screen.

4. The method of claim 1, wherein displaying the editable memo area comprises setting the memo area in a message display area such that the editable memo area is editable through one of an amendment, a deletion, a copy, a movement, an addition, a pasting, and a list view of the memo data.

5. The method of claim 1, wherein displaying the editable memo area comprises setting the memo area in an empty area at an upper side, a lower side, a left side or a right side of the plurality of displayed SMS messages or setting an area overlaid with the plurality of displayed SMS messages as the memo area.

6. The method of claim 1, further comprising displaying the memo data detected as input as at least one of a character type, an image type or a sound type.

7. The method of claim 1, further comprising detecting at least one of an icon or a specific URL address in the memo data.

8. The method of claim 1, further comprising:
    receiving a display signal requesting to display the message;
    determining whether memo data is associated with the message;
    extracting the associated memo data; and
    displaying the associated memo data with the message.

9. The method of claim 1, further comprising:
    receiving a signal requesting an edit of the memo data;
    editing the memo data in accordance with an editing signal; and
    associating edited memo data with the message.

10. The method of claim 1, further comprising detecting edits to the memo data such that the edits comprise amending, deleting, copying content of the memo data, or pasting copied data.

11. An apparatus for operating a message function in connection with a memo function, the apparatus comprising:

a memory storing a plurality of contacts;
a processor, operatively coupled to the memory; and
a touch screen comprising:
- a display panel operatively coupled to the processor; and
- a touch panel operatively coupled to the display panel;
- wherein the display panel displays a plurality of Short Messaging Service (SMS) messages associated with a particular contact of the plurality of contacts in an interface, wherein each of the plurality of SMS messages occupy separate portions of the display;
- wherein the touch screen detects a memo addition event to add memo data to the message, and
- wherein the display panel displays an editable memo area, in response the memo addition event, in conjunction with the message, wherein the editable memo area forms a portion of the interface and occupies a separate portion of the display, the separate portion of the display non-overlapping with the separate portions of the display occupied by the plurality of SMS messages.

12. The apparatus of claim 11, wherein the processor sets a predefined area of a display screen as the editable memo area or set the editable memo area in accordance with touch input detected at a location of the display screen.

13. The apparatus of claim 11, wherein the processor sets the editable memo area in an empty area at an upper side, a lower side, a left side or a right side of the plurality of displayed SMS messages or set an area overlaid with the plurality of displayed SMS messages as the editable memo area.

14. The apparatus of claim 11, wherein the display panel displays the memo data detected as input by the touch panel as at least one of a character type, an image type or a sound type.

15. The apparatus of claim 11, wherein the processor detects at least one of an icon or a specific URL address in the memo data.

16. A non-transitory computer-readable storage medium storing one or more programs comprising instructions which, when executed by an electronic device, cause the device to execute the method according to claim 1.

* * * * *